United States Patent
Hsiao et al.

(10) Patent No.: US 12,061,923 B2
(45) Date of Patent: Aug. 13, 2024

(54) MEMORY PROTECTION FOR VIRTUAL MACHINES

(71) Applicant: MediaTek Inc., Hsinchu (TW)

(72) Inventors: Chih-Hsiang Hsiao, Hsinchu (TW); Chih-Pin Su, Hsinchu (TW)

(73) Assignee: MediaTek Inc., Hsinchu (TW)

(*) Notice: Subject to any disclaimer, the term of this patent is extended or adjusted under 35 U.S.C. 154(b) by 518 days.

(21) Appl. No.: 17/524,046

(22) Filed: Nov. 11, 2021

(65) Prior Publication Data

US 2022/0179677 A1 Jun. 9, 2022

Related U.S. Application Data

(60) Provisional application No. 63/123,046, filed on Dec. 9, 2020.

(51) Int. Cl.
G06F 9/455 (2018.01)
(52) U.S. Cl.
CPC .............. *G06F 9/45558* (2013.01); *G06F 2009/45583* (2013.01)
(58) Field of Classification Search
CPC .................................................. G06F 9/45558
USPC .................................................. 718/1
See application file for complete search history.

(56) References Cited

U.S. PATENT DOCUMENTS

| | | | | |
|---|---|---|---|---|
| 7,401,178 B1* | 7/2008 | Tene | ................... | G06F 9/45537 711/2 |
| 10,515,018 B2* | 12/2019 | Huang | ................ | G06F 12/0253 |
| 2006/0161719 A1* | 7/2006 | Bennett | ............... | G06F 9/45558 711/6 |
| 2009/0172341 A1* | 7/2009 | Durham | .................. | G06F 9/461 711/E12.059 |
| 2014/0108701 A1* | 4/2014 | Liljeberg | ............ | G06F 9/45558 711/6 |
| 2014/0380009 A1* | 12/2014 | Lemay | ................ | G06F 9/45558 711/163 |
| 2015/0100717 A1* | 4/2015 | Bennett | ............... | G06F 9/45533 711/6 |
| 2016/0246732 A1* | 8/2016 | Shanbhogue | ....... | G06F 9/30076 |
| 2017/0249260 A1* | 8/2017 | Sahita | ................. | G06F 12/1027 |
| 2017/0357579 A1* | 12/2017 | Tsirkin | ............... | G06F 12/1009 |
| 2018/0173645 A1* | 6/2018 | Parker | ................. | G06F 12/1458 |
| 2019/0213028 A1* | 7/2019 | Teng | ......................... | G06F 9/48 |
| 2022/0179677 A1* | 6/2022 | Hsiao | .................. | G06F 9/45558 |
| 2023/0091722 A1* | 3/2023 | Hsiao | .................... | G06F 3/0622 711/163 |

* cited by examiner

*Primary Examiner* — Mehran Kamran
(74) *Attorney, Agent, or Firm* — Tong J. Lee

(57) ABSTRACT

A system includes a memory addressable by addresses within a physical address (PA) space, and one or more processors that perform operations of virtual machines (VMs). The VMs are allocated with extended PA regions outside the PA space. The system further includes a memory interface controller coupled to the memory and the one or more processors. The memory interface controller receives a request for accessing an address in the extended PA regions from a requesting VM, and uses a remap circuit to map the address in the extended PA regions to a remapped address in the PA space. A memory protection unit (MPU) in the memory interface controller grants or denies the request based on stored information indicating whether the remapped address is accessible to the requesting VM.

20 Claims, 5 Drawing Sheets

MEMORY PROTECTION FOR VIRTUAL MACHINES

CROSS-REFERENCE TO RELATED APPLICATIONS

This application claims the benefit of U.S. Provisional Application No. 63/123,046 filed on Dec. 9, 2020, the entirety of which is incorporated by reference herein.

TECHNICAL FIELD

Embodiments of the invention relate to a computing system that provides memory protection to virtual machines.

BACKGROUND

A hypervisor enables multiple operating systems to run in parallel on a single physical machine. These operating systems, referred to as "guest operating systems," can include multiple instances of an operating system as well as different operating systems. Multiple virtual machines (VMs) can run on top of the hypervisor. Each VM runs a guest operating system to manage resource allocation for the VM. The hypervisor typically uses a memory management unit (MMU) to support address translation and memory protection for the VMs. In a multiprocessor system, each processor core has its own MMU.

An MMU is responsible for translating virtual addresses to physical addresses. The MMU may include one or more translation look-aside buffers (TLBs) to store a mapping between virtual addresses and their corresponding physical addresses. The MMU provides a two-stage memory translation mechanism. Every memory access from applications running on a VMs undergoes a two-stage translation in the MMU. A guest operating system configures first-stage translation tables that map a virtual address to an intermediate physical address. The hypervisor configures second-stage translation tables that map the intermediate physical address to a physical address. Thus, the two-stage translation enables a hypervisor to control the guests' view of the memory and to restrict the physical memory that a guest can access.

MMU hardware can be complex and costly. Management of the MMU often requires highly complex software and incurs performance overhead. Thus, there is a need for developing a low-complexity and low-overhead memory protection scheme for a virtual machine system.

SUMMARY

In one embodiment, a system is provided for supporting virtual machines (VMs). The system includes a memory addressable by addresses within a physical address (PA) space, and one or more processors that perform operations of the VMs. The VMs are allocated with extended PA regions outside the PA space. The system further includes a memory interface controller coupled to the memory and the one or more processors. The memory interface controller receives a request for accessing an address in the extended PA regions from a requesting VM, and uses a remap circuit to map the address in the extended PA regions to a remapped address in the PA space. A memory protection unit (MPU) in the memory interface controller grants or denies the request based on stored information indicating whether the remapped address is accessible to the requesting VM.

In another embodiment, a method is provided for controlling access to a physical address (PA) space in a system that supports multiple VMs. According to the method, a request is received from a given VM for accessing an address in extended PA regions that are outside the PA space and are allocated to the VMs. A remap circuit maps the address to a re-mapped address within the PA space. The request is granted or denied based on stored information indicating whether the remapped address is accessible to the given VM.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a memory protection mechanism to maintain memory separation among virtual machines (VMs). The memory protection mechanism uses hardware circuits for address re-mapping and memory protection. The hardware circuits manage memory separation of VMs such that the complexity of memory management units (MMUs) can be reduced. The hardware-based mechanism is fast and efficient and has a small footprint in the circuit area.

Figure 1:
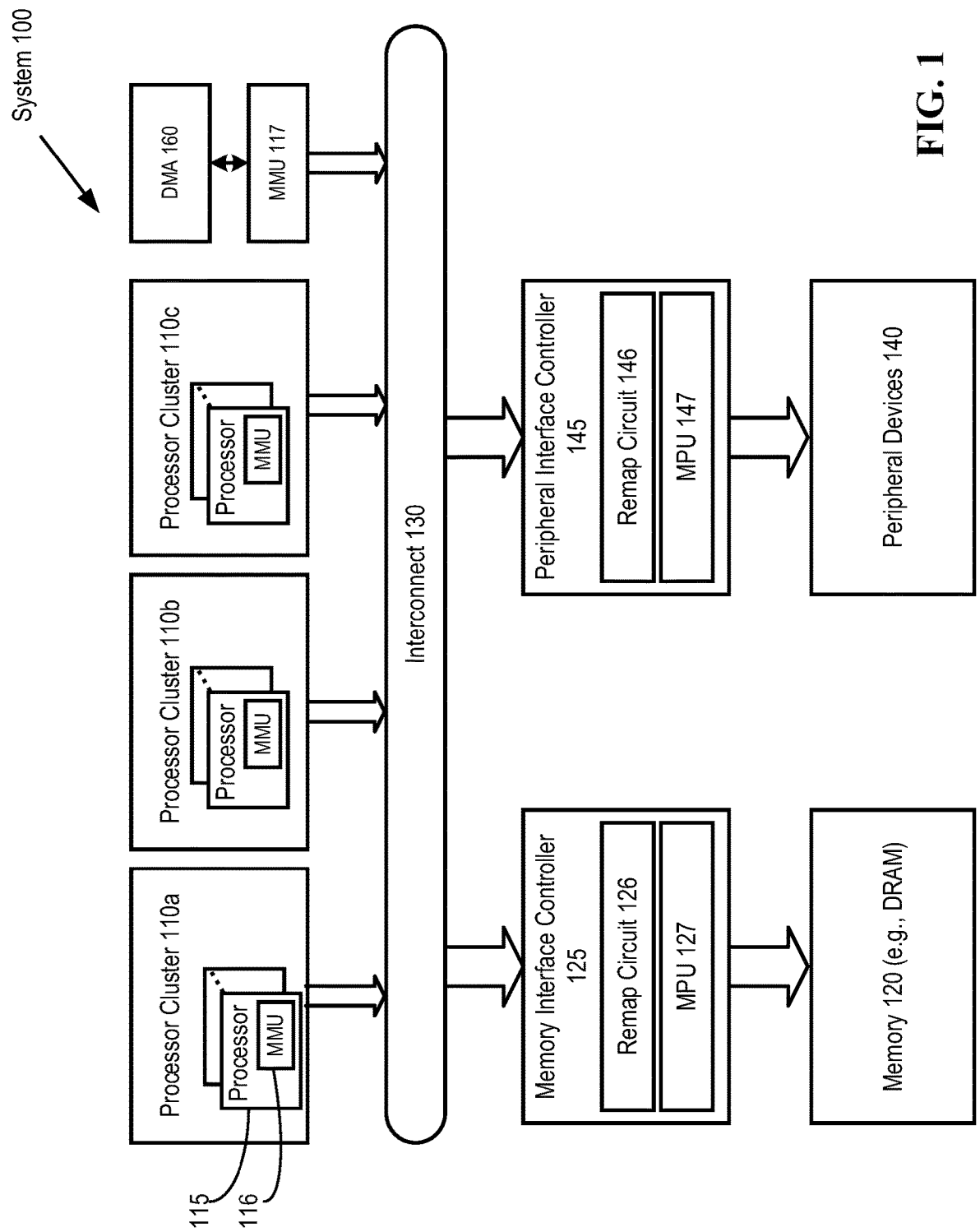
FIG. 1 illustrates a system in which embodiments of the invention may operate.

FIG. 1 is a block diagram illustrating a system 100 according to one embodiment. The system 100 includes multiple processors 115 in one or more processor clusters, such as processing clusters 110a, 110b, and 110c. The processors 115 may include central processing units (CPUs), graphics processing units (GPUs), digital processing units (DSPs), multimedia processors, neural processing unit (NPU), and/or other general-purpose and/or special-purpose processing circuitry. In some embodiments, the processor 115 may be referred to as a processor core, a microprocessor, a core, a multi-core processor, a computing unit, an execution unit, processing circuitry, or the like. The processor clusters 110a, 110b, and 110c are collectively referred to as the processor clusters 110.

The processors 115 in the processor clusters 110 may have the same or compatible Instruction Set Architecture (ISA), which enables them to execute instructions from the same or compatible instruction set. In some embodiments, the processors 115 in different processor clusters 110 may have different microarchitecture in the implementation of the same or compatible ISA. Examples of compatible ISA may include the ISA of the same processor architecture series, such as the RISC-V® series, the ARM® series, the MIPS® series, or other processor architecture series. The processors 115 in the processor clusters 110 can execute instructions independent of each other. In one embodiment, the processor clusters 110 may be part of a System-on-a-Chip (SoC) platform. It is understood the embodiment of FIG. 1 is simplified for illustration purposes. Additional hardware components may be included, and some of the components shown in FIG. 1 may be omitted.

In one embodiment, the processors 115 have access to a memory 120. The memory 120 may be the system memory or the main memory of the system 100. The memory 120 may include Random Access Memory (RAM) devices such as a Dynamic Random Access Memory (DRAM) device, a flash memory device, and/or other volatile or non-volatile memory devices. The processors 115 may access the memory 120 via a bus or an interconnect 130. Access to the memory 120 is under the control of a memory interface controller 125. In one embodiment, the processors 115 are operative to execute instructions stored in the memory 120 to perform virtual memory management and memory separation for VMs.

In one embodiment, the processors 115 also have access to peripheral devices 140, also referred to as I/O devices such as a keyboard, a speaker, a microphone, a display, a camera, etc. The peripheral devices 140 may be accessed via a bus or the interconnect 130 under the control of a peripheral interface controller 145. The peripheral devices 140 may include I/O devices and may be memory-mapped. For example, the peripheral interface controller 145 may include or control a device controller that is mapped to a physical address range in which I/O data speed, format, etc. are passed between the processor 115 and the device controller. In one embodiment, the processors 115 are operative to execute instructions stored in the memory 120 to perform virtual memory management and memory seperation for VMs regarding the access to the peripheral devices 140.

In one embodiment, each processor 115 uses a memory management unit (MMU) 116 to perform two-stage address translations from a virtual address (VA) space to an intermediate physical address (IPA) space, and from the IPA space to a physical address (PA) space. In one embodiment, the PA space may be a memory address space in a DRAM (e.g., the memory 120). The mapping between the VA space to the IPA space is managed by a guest operating system that runs on a VM, and the mapping between the IPA space to the PA space is managed by a hypervisor or a host operating system that manages the hardware resources of the system 100. In one embodiment, the system 100 further includes an MMU 117 shared by direct memory access (DMA) devices 160 that, among other functions, perform data transfers between the devices in the system 100.

The memory interface 125 includes a re-map circuit 126 and a memory protection unit (MPU) 127. The remap circuit 126 remaps an extended PA region to a re-mapped PA region in the PA space, where the extended PA region is outside the PA space and is allocated to a VM. The MPU is a hardware circuit including a local memory to store the access rights information of each VM with respect to the PA space. The access rights information may be stored in data structures referred to as permission filters. The MPU may use different permission filters for different VMs. In one embodiment, a permission filter stores an indication of one or more address ranges for a corresponding VM, where the one or more address ranges contain the physical addresses accessible by the VM. This data structure for a given VM is referred to as the permission filter for the given VM. For each address range, the permission filter may indicate the types of access rights; e.g., read, write, execute, etc. The address range may be a fixed-sized address block or a configurable-sized address segment. The MPU grants or denies a VM's access requests to a physical address based on the information stored in the corresponding permission filter.

In one embodiment, the peripheral interface controller 145 also includes a remap circuit 146 and an MPU 147, which perform analogous functions to the remap circuit 126 and the MPU 127. In one embodiment, the remap circuit 146 may perform the second-stage MMU operations to map a VM's address in the IPA space to the PA space. The MPU 147 also uses permission filters to store access rights information for the VMs, where the access rights are with respect to regions in the PA space that are allocated to controllers of the peripheral devices 140.

Thus, the remap circuits 126, 146, and the MPU 127, 147 provide memory separation of VMs by restricting the physical memory and the memory-mapped resources that a VM can access. This hardware-based memory protection mechanism has low complexity and low overhead.

Figure 2:
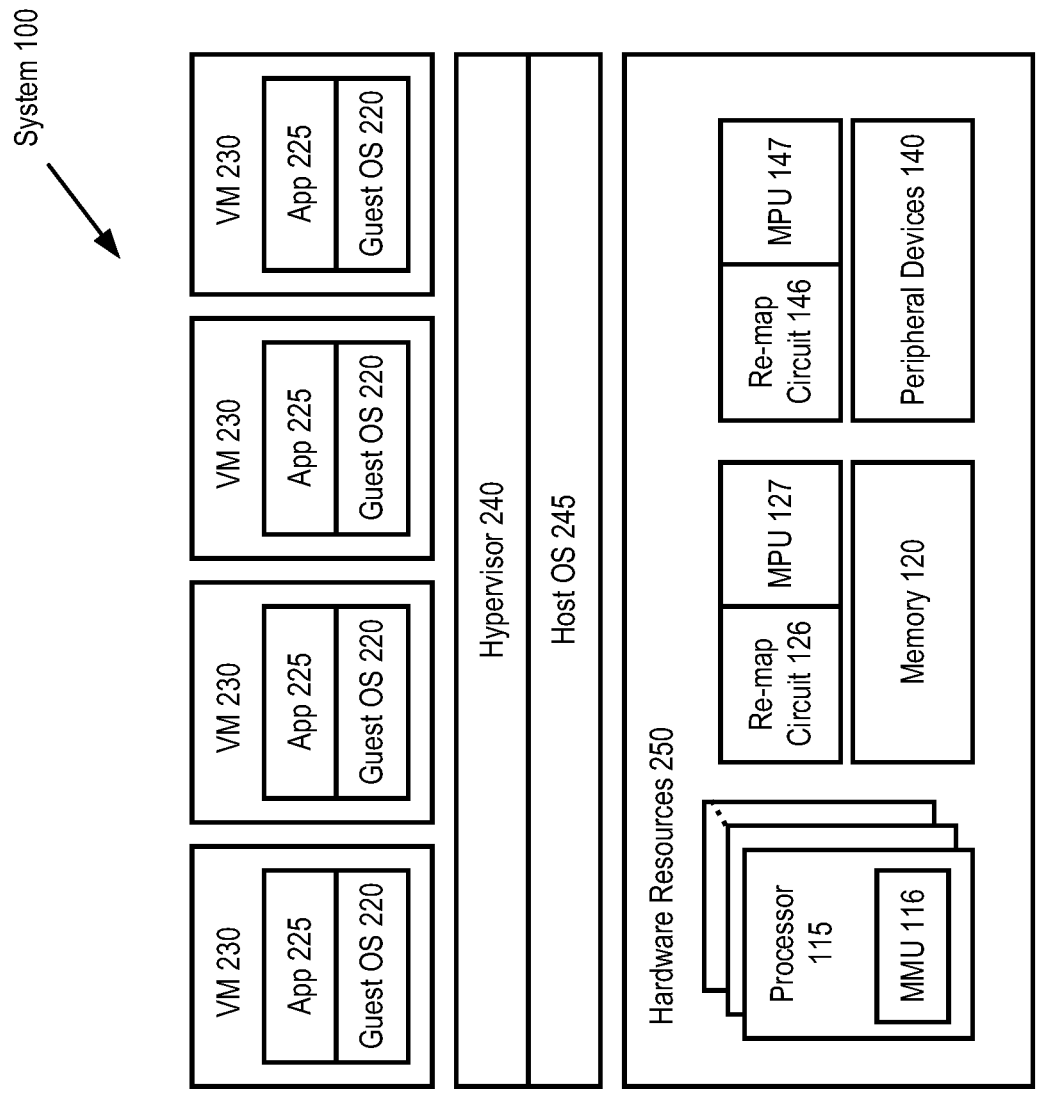
FIG. 2 illustrates a software structure supported by the system in FIG. 1 according to one embodiment.

Referring also to FIG. 2, which illustrates a software structure supported by the system 100 according to one embodiment. The hardware components described in connection with FIG. 1 are collectively referred to as hardware resources 250 in FIG. 2. In one embodiment, the system 100 supports multiple VMs 230. Each VM 230 runs a guest operating system 220 that manages a VA space and the allocation of an IPA space for applications 225. A hypervisor 240 creates and runs the VMs 230; e.g., by managing the scheduling of the hardware resources 250 for the VMs 230. In one embodiment, the hypervisor 240 may run on top of a host operating system 245; alternatively, the hypervisor 240 may be part of the host operating system 245. The hypervisor 240 manages the mapping between the IPA space and an extended PA space for the VMs 230. As will be shown in FIG. 3, the extended PA space is the PA space of the memory 120 plus the extended PA regions allocated to the VMs 230. The hypervisor 240 may configure the remap circuits 126, 146 and the MPU 127, 147 according to the allocation of physical addresses to each VM 230.

Figure 3:
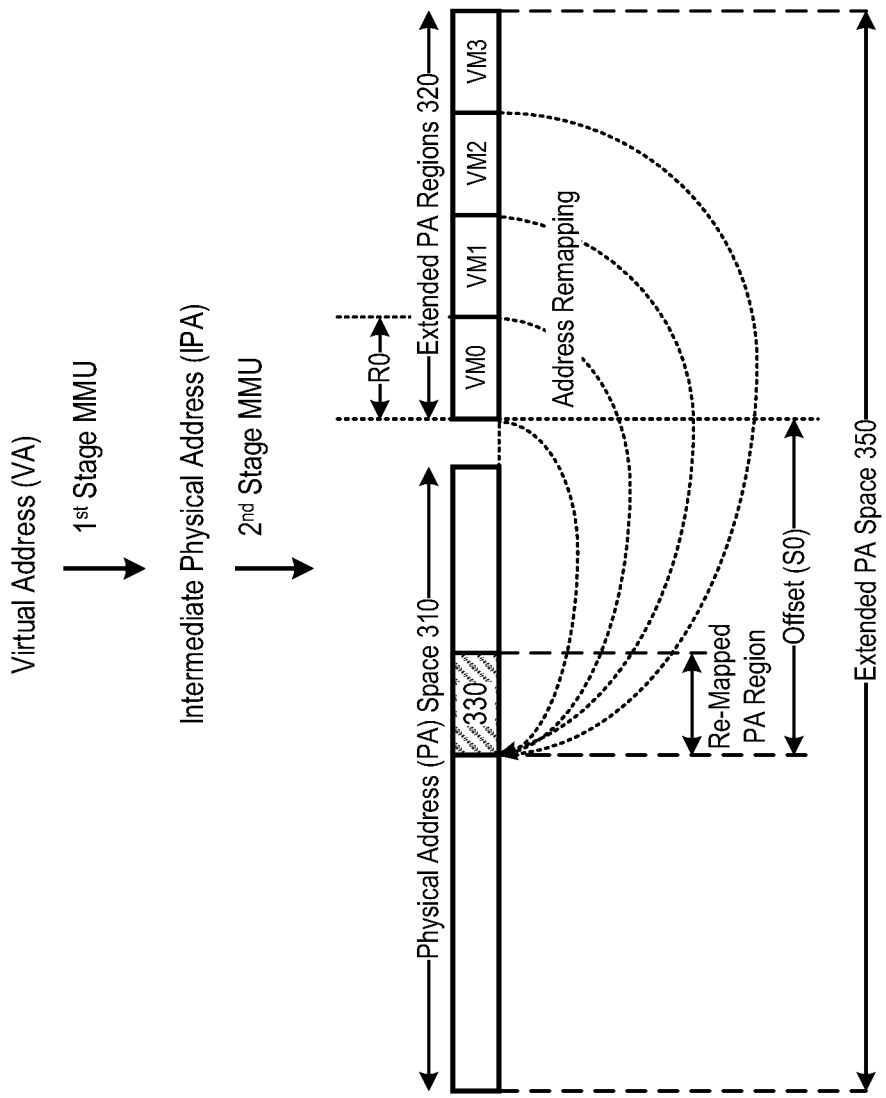
FIG. 3 is a diagram illustrating multiple stages of address mapping according to one embodiment.

FIG. 3 is a diagram illustrating multiple stages of address mapping according to one embodiment. As mentioned before, a first-stage MMU translates a virtual address to an intermediate physical address, and a second-stage MMU translates the intermediate physical address to a physical address. In the second-stage MMU translation, physical addresses allocated to VMs are mapped into extended PA regions 320. For example, a virtual address allocated to VM0 is mapped by the second-stage MMU to R0, which is an extended PA region 320 allocated to VM0. In an example of four VMs, each VM is allocated with one extended PA region, and different VMs are allocated with different extended PA regions. All of the extended PA regions 320 are non-overlapping and have the same size. The extended PA regions 320 are outside of the PA space 310; the PA space 310 and the extended PA regions 320 are collectively referred to as an extended PA space 350. It is understood that the memory protection mechanism described herein is applicable to any number of VMs.

In one embodiment, different extended PA regions have different offsets from a remapped PA region 330 in the PA space 310. The offsets are also referred to as base address offsets. For example, the extended PA region (R0) allocated to VM0 has an offset (S0) from the remapped PA region; more specifically, the base address of R0 is offset from the base address of the remapped PA region 330 by S0. The extended PA region allocated to VM1 may have an offset (S1) from the remapped PA region 330, where S1=S0+the size of R0. The offsets for the extended PA regions allocated to VM2 and VM3 can be similarly calculated. Taking R0 as an example, the remapping of R0 to the remapped PA region 330 shifts each address in R0 by S0. The remapping of other extended PA regions can be similarly calculated.

In one embodiment, the extended PA regions 320 allocated to the VMs may not be immediately adjacent to the PA space 310; alternatively, the extended PA regions 320 allocated to the VMs may be immediately adjacent to the PA space 310. In one embodiment, the extended PA regions 320 allocated to different VMs may be consecutive in the extended PA space 350 as shown in FIG. 3; alternatively, the extended PA regions 320 allocated to different VMs may be non-consecutive in the extended PA space 350. In one embodiment, the base address and/or the size of each extended PA region 320 may be configurable.

Allocating the extended PA regions 320 to VMs enables a system to use different page sizes for a guest operating system and a host operating system. Suppose that VM0-VM3 run on top of multiple instances of a guest operating system in a computing system. The guest operating system may use a first page size for virtual memory management. The host operating system of the computing system can use a second page size that is greater than the first page size for virtual memory management. A greater page size can reduce the overhead of host system operations. On the other hand, a smaller page size may be more suitable for VM operations. The MMU of each processor may perform address translations using the first page size for host system operations and the second page size for VM operations.

Figure 4:
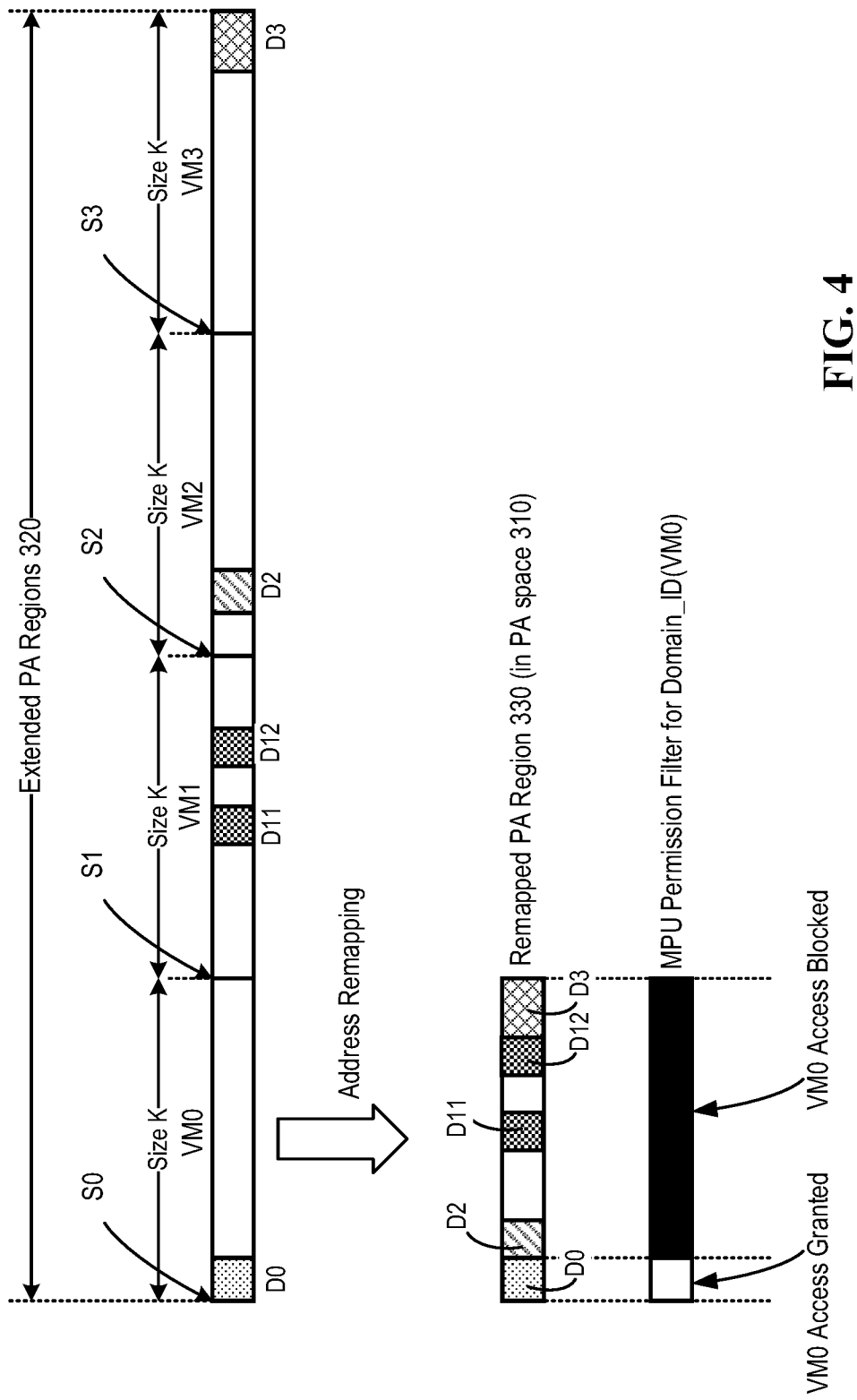
FIG. 4 is a diagram illustrating memory protection according to one embodiment.

FIG. 4 is a diagram illustrating memory protection according to one embodiment. In this example, four VMs (VM0-VM3) are allocated with extended PA regions (e.g., R0, R1, R2, and R3, respectively). The four extended PA regions have the same size (e.g., K bytes) and are non-overlapping. The base address offsets for the four VMs are indicated as S1, S2, S3, and S4, respectively. The remap circuit (e.g., the remap circuit 126 in FIG. 1) can map all four extended PA regions into one remapped PA region. In one embodiment, the remap circuit calculates the remapped address of a given address in an extended PA region (e.g., R0) by subtracting the offset (e.g., S0) from the given address.

Within each extended PA region, the hypervisor or the host operating system may allocate one or more address blocks and/or address segments to the corresponding VM. The size of the blocks may be fixed (e.g., 2 megabytes each), and the size of the address segments may be configurable. In the example of FIG. 4, VM0 is allocated with address block D0, VM1 is allocated with address blocks D11 and D12, VM2 is allocated with address block D2, and VM3 is allocated with address segment D3. All of the allocated address blocks and segments are non-overlapping when R0-R3 are mapped to the remapped PA region. In one embodiment, each address segment can be individually switched on (i.e., activated) or off (i.e., deactivated) for allocation.

Referring also to FIG. 1, the memory interface controller 125 may receive a request from a requesting VM (e.g., VM0) for accessing a requested address in the PA space. From the request, the memory interface controller 125 identifies a domain ID identifying the requesting VM as VM0. The remap circuit 126 identifies the base address offset of the extended PA region containing the requested address, and removes the base address offset from the requested address to obtain a remapped address in the PA space. The MPU 127 checks the permission filter of the identified domain ID to determine whether the request should be granted or denied. The permission filter associates VM0's domain ID with a list of address blocks and/or address segments that VM0 is allowed or denied access.

The description in connection with FIG. 3 and FIG. 4 applies to access control and protection of the peripheral devices 140 in FIG. 1. In one embodiment, the peripheral interface controller 145 may receive a request from a requesting VM for accessing an address allocated to a peripheral device. The peripheral interface controller 145 may use a peripheral remap circuit (e.g., the remap circuit 146) to map the address to a remapped address in the PA space. The peripheral interface controller 145 may use a peripheral MPU (e.g., the MPU 147) to determine whether to deny or grant the request based on the remapped address and information indicating addresses in the PA space that are accessible to the requesting VM.

Figure 5:
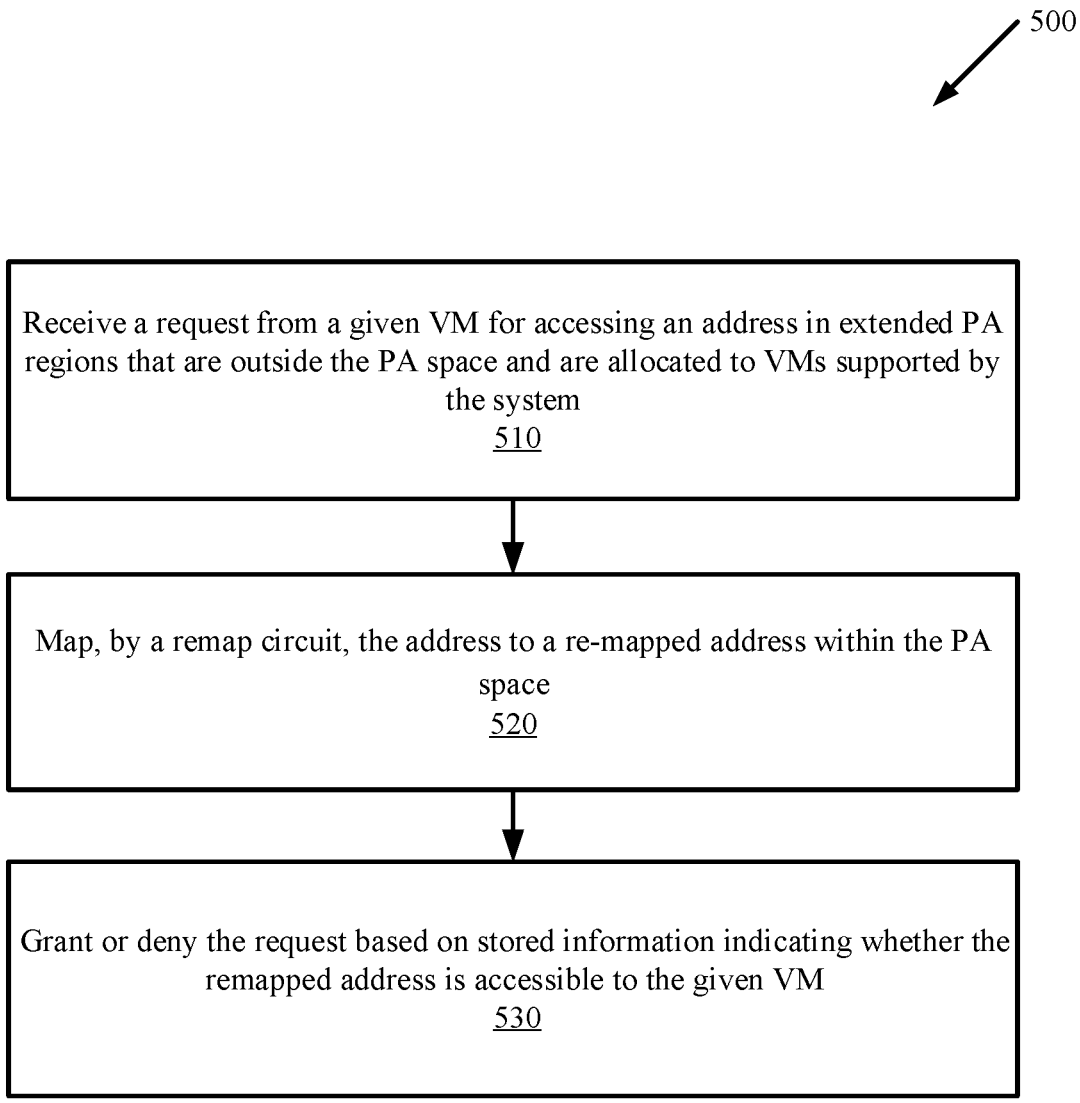
FIG. 5 is a flow diagram illustrating a method for memory protection according to one embodiment.

FIG. 5 is a flow diagram illustrating a method 500 for memory protection according to one embodiment. In one embodiment, the method 500 may be performed by a system that supports VMs, such as the system 100 in FIG. 1 and FIG. 2. The method 500 starts at step 510 when the system receives, from a given one of the VMs, a request for accessing an address in extended PA regions that are outside the physical address (PA) space and are allocated to the VMs. At step 520, a remap circuit maps the address to a re-mapped address within the PA space. At step 530, an MPU grants or denies the request based on stored information indicating whether the remapped address is accessible to the given VM.

In one embodiment, the stored information is stored in a permission filter used by the MPU to associate a domain ID identifying the requesting VM with addresses in the PA space accessible to the requesting VM. The addresses may be indicated by: one or more address blocks having the same block size, one or more address segments having configurable sizes, or a combination of the one or more address blocks and the one or more address segments.

In one embodiment, the extended PA regions have the same size and are non-overlapping, and each extended PA region is allocated to a different VM. The remap circuit maps all of the extended PA regions to a remapped PA region containing contiguous addresses in the PA space. Each extended PA region has a base address offset from the remapped PA region in the PA space. The remap circuit calculates the remapped address by removing the base address offset from the address in the request. The base address offset is an offset between an extended PA region containing the address and the remapped PA region in the PA space The operations of the flow diagram of FIG. 5 have been described with reference to the exemplary embodiments of FIGS. 1 and 2. However, it should be understood that the operations of the flow diagram of FIG. 5 can be performed by embodiments of the invention other than the embodiments of FIGS. 1 and 2, and the embodiments of FIGS. 1 and 2 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system operative to support virtual machines (VMs), comprising:
   a memory addressable by addresses within a physical address (PA) space;
   one or more processors to perform operations of the VMs that are allocated with extended PA regions outside the PA space; and
   a memory interface controller coupled to the memory and the one or more processors to receive a request for accessing an address in the extended PA regions from a requesting VM, the memory interface controller further comprising:
   a remap circuit to map the address in the extended PA regions to a remapped address in the PA space; and
   a memory protection unit (MPU) to grant or deny the request based on stored information indicating whether the remapped address is accessible to the requesting VM.

2. The system of claim 1, wherein the extended PA regions have a same size and are non-overlapping, and each extended PA region is allocated to a different one of the VMs.

3. The system of claim 1, wherein the remap circuit is operative to map all of the extended PA regions to a remapped PA region containing contiguous addresses in the PA space.

4. The system of claim 3, wherein each extended PA region has a base address offset from the remapped PA region in the PA space.

5. The system of claim 3, wherein the remap circuit is operative to calculate the remapped address by removing a base address offset from the address in the request, and wherein the base address offset is an offset between an extended PA region containing the address and the remapped PA region in the PA space.

6. The system of claim 1, wherein the stored information is stored in a permission filter used by the MPU to associate a domain identifier identifying the requesting VM with addresses in the PA space accessible to the requesting VM.

7. The system of claim 6, wherein the addresses are indicated by one or more address blocks having a same block size, one or more address segments having configurable sizes, or a combination of the one or more address blocks and the one or more address segments.

8. The system of claim 1, wherein a guest operating system that manages the VMs uses a first page size for virtual memory management, and a host operating system that manages the system uses a second page size greater than the first page size for virtual memory management.

9. The system of claim 8, wherein each processor uses a memory management unit (MMU) to perform the virtual memory management, and wherein the first page size and the second page size are page sizes used by the MMU to perform address translations under the guest operating system and the host operating system, respectively.

10. The system of claim 1, further comprising:
    one or more peripheral devices that are memory-mapped; and
    a peripheral interface controller coupled to the one or more processors and the one or more peripheral devices to receive a second request from the requesting VM for accessing a second address allocated to a peripheral device, the peripheral interface controller further comprising:
    a peripheral remap circuit to map the second address to a second remapped address in the PA space; and
    a peripheral MPU to determine whether to grant or deny the second request based on the second remapped address and information indicating addresses in the PA space that are accessible to the requesting VM.

11. A method for controlling access to a physical address (PA) space in a system that supports a plurality of virtual machines (VMs), comprising:
    receiving a request from a given VM for accessing an address in extended PA regions that are outside the PA space and are allocated to the VMs;
    mapping, by a remap circuit, the address to a re-mapped address within the PA space; and
    granting or denying the request based on stored information indicating whether the remapped address is accessible to the given VM.

12. The method of claim 11, wherein the extended PA regions have a same size and are non-overlapping, and each extended PA region is allocated to a different one of the VMs.

13. The method of claim 11, further comprising:
    mapping, by the remap circuit, each extended PA region to a remapped PA region that contains contiguous addresses in the PA space.

14. The method of claim 13, wherein each extended PA region has a base address offset from the remapped PA region in the PA space.

15. The method of claim 13, wherein the mapping further comprises:
    calculating, by the remap circuit, the remapped address by removing a base address offset from the address in the request, wherein the base address offset is an offset between an extended PA region containing the address and the remapped PA region in the PA space.

16. The method of claim 11, wherein the stored information is stored in a permission filter used by the MPU to associate a domain identifier identifying the requesting VM with addresses in the PA space accessible to the requesting VM.

17. The method of claim 16, wherein the addresses are indicated by one or more address blocks having a same block size, one or more address segments having configurable sizes, or a combination of the one or more address blocks and the one or more address segments.

18. The method of claim 11, wherein a guest operating system that manages the VMs uses a first page size for virtual memory management, and a host operating system that manages the system uses a second page size greater than the first page size for virtual memory management.

19. The method of claim 18, wherein each processor uses a memory management unit (MMU) to perform the virtual memory management, and wherein the first page size and the second page size are page sizes used by the MMU to perform address translations under the guest operating system and the host operating system, respectively.

20. The method of claim 11, further comprising:
   receiving a second request from the given VM for accessing a second address allocated to a peripheral device in the system;
   mapping, by a peripheral remap circuit, the second address to a second re-mapped address within the PA space; and
   granting or denying the second request based on the second remapped address and information indicating addresses in the PA space that are accessible to the given VM.

* * * * *